US012572201B2

(12) United States Patent
Suzuki

(10) Patent No.: US 12,572,201 B2
(45) Date of Patent: Mar. 10, 2026

(54) ELECTRONIC DEVICE AND CONTROL METHOD FOR ELECTRONIC DEVICE

(71) Applicant: CANON KABUSHIKI KAISHA, Tokyo (JP)

(72) Inventor: Asahi Suzuki, Kanagawa (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 65 days.

(21) Appl. No.: 18/738,102

(22) Filed: Jun. 10, 2024

(65) Prior Publication Data

US 2025/0013298 A1 Jan. 9, 2025

(30) Foreign Application Priority Data

Jul. 6, 2023 (JP) ................................ 2023-111472

(51) Int. Cl.
*G06F 3/01* (2006.01)
*G06T 3/4038* (2024.01)
*G06T 7/11* (2017.01)

(52) U.S. Cl.
CPC ............ *G06F 3/013* (2013.01); *G06T 3/4038* (2013.01); *G06T 7/11* (2017.01)

(58) Field of Classification Search
None
See application file for complete search history.

(56) References Cited

U.S. PATENT DOCUMENTS 6,608,615 B1 * 8/2003 Martins ............... G06F 16/9577 345/157
2007/0070087 A1 * 3/2007 Sato .................. H04N 1/32101 348/E5.045
2017/0083087 A1 * 3/2017 Plummer ............. G06V 20/597
2017/0115742 A1 * 4/2017 Xing ..................... G06F 3/0485
2022/0066537 A1 * 3/2022 Govindgari ............ G06Q 30/08
2022/0343604 A1 * 10/2022 Kawakami .............. G06F 3/011

FOREIGN PATENT DOCUMENTS

JP 2018-073104 A 5/2018
JP 2018-074294 A 5/2018
WO 2020/016970 A1 1/2020

* cited by examiner

*Primary Examiner* — Nicholas J Lee
(74) *Attorney, Agent, or Firm* — Carter, DeLuca & Farrell LLP

(57) ABSTRACT

An electronic device includes: a processor, and a memory storing a program which, when executed by the processor, causes the electronic device to perform acquisition processing to acquire line-of-sight statistic information representing a degree at which a line of sight is directed to each of regions in a virtual space; and perform control processing to control a method of image-rendering processing for an image of the virtual space for each of the regions on the basis of the line-of-sight statistic information.

17 Claims, 7 Drawing Sheets

100

110

111
CONTROL UNIT

112
ROM

113
RAM

114
COMMUNICATION UNIT

115
DISPLAY UNIT

116
POSITION/ ORIENTATION ACQUISITION UNIT

117
LINE-OF-SIGHT-DIRECTION ACQUISITION UNIT

120

121
CONTROL UNIT

122
ROM

123
RAM

124
COMMUNICATION UNIT

125
IMAGE-RENDERING UNIT

126
STATISTIC INFORMATION ACQUISITION UNIT

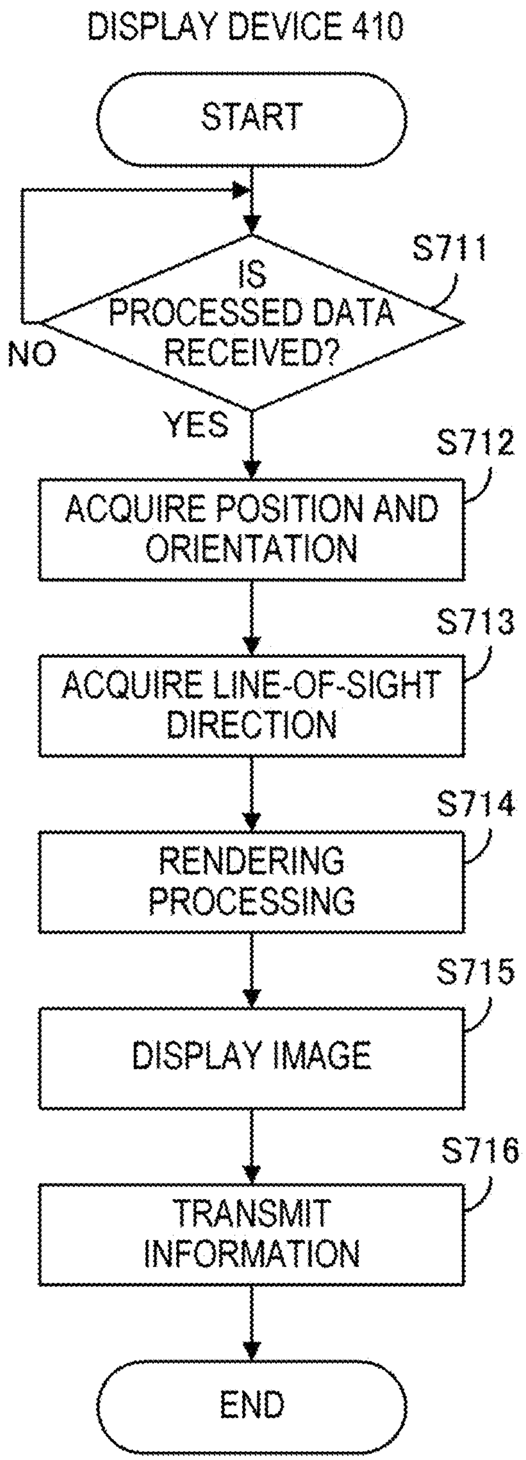

*FIG. 7A*

DISPLAY DEVICE 410

START

S711
IS PROCESSED DATA RECEIVED?

NO

YES

S712
ACQUIRE POSITION AND ORIENTATION

S713
ACQUIRE LINE-OF-SIGHT DIRECTION

S714
RENDERING PROCESSING

S715
DISPLAY IMAGE

S716
TRANSMIT INFORMATION

END

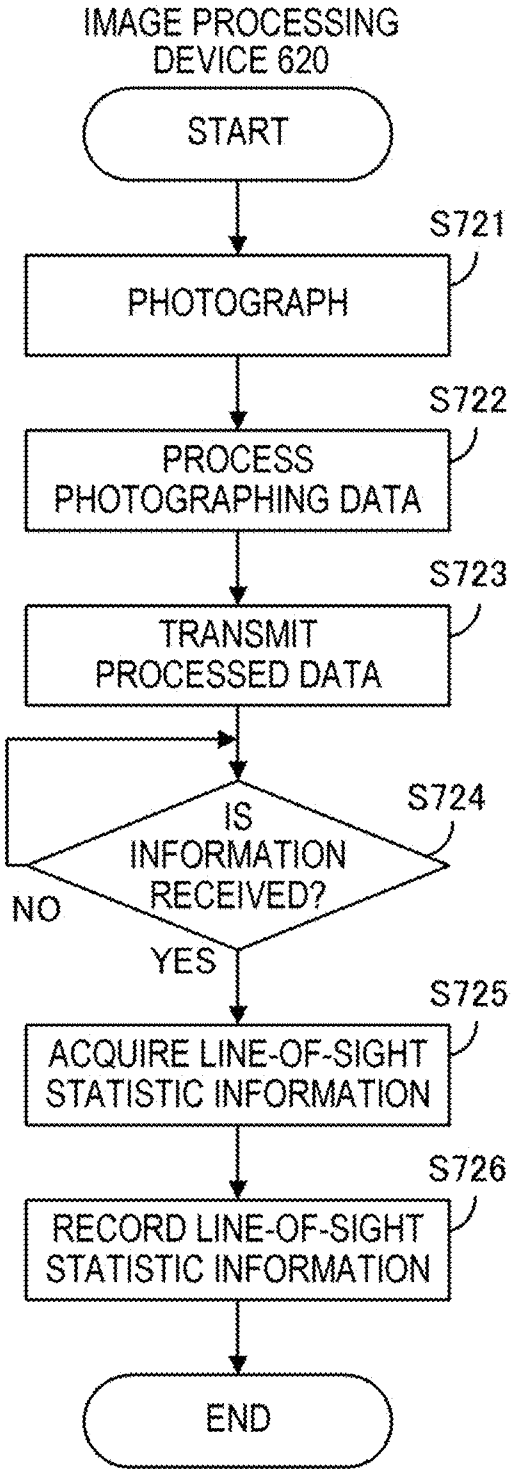

*FIG. 7B*

IMAGE PROCESSING DEVICE 620

START

S721
PHOTOGRAPH

S722
PROCESS PHOTOGRAPHING DATA

S723
TRANSMIT PROCESSED DATA

S724
IS INFORMATION RECEIVED?

NO

YES

S725
ACQUIRE LINE-OF-SIGHT STATISTIC INFORMATION

S726
RECORD LINE-OF-SIGHT STATISTIC INFORMATION

END

ELECTRONIC DEVICE AND CONTROL METHOD FOR ELECTRONIC DEVICE

BACKGROUND OF THE INVENTION

Field of the Invention

The present invention relates to an electronic device and a control method for the electronic device.

Description of the Related Art

In recent years, a virtual reality (VR) technology which allows a virtual world to be experienced is known. For example, a content referred to as a virtual tour is provided which uses the VR technology to reproduce, in a virtual space, a sightseeing spot, a museum, or the like and can be viewed from a free perspective. A content such as the virtual tour can be viewed using a head mounted display (HMD) or the like. The HMD renders display data according to a position and an orientation of a user wearing the HMD to thereby display a virtual image to the user.

When high-precision rendering is performed at the time of virtual image generation, a processing load increases. To allow the user to enjoy comfortable viewing, it is preferable to reduce the processing load. Japanese Patent Application Publication No. 2018-73104 discloses a technology of performing rendering so that rendering processing in a region including a focal position of user attention is larger in terms of processing amount than rendering processing in a region not including the focal position.

Meanwhile, Japanese Patent Application Publication No. 2018-74294 discloses a technology of generating a three-dimensional video based on a viewpoint position of a virtual camera and delivering a two-dimensional video, with a reaction and a viewpoint of a viewer being taken into consideration even after the fact on the basis of the generated three-dimensional video.

However, a position to which a user directs his or her line of sight may not coincide with a worthful position (position worthy of attention) in a content. While the user is viewing a virtual space from a free perspective, when high-precision rendering is performed on a region including a focus of user attention, rendering precision in the worthful region in the content may deteriorate or rendering may be delayed by a visual field change.

SUMMARY OF THE INVENTION

The present invention provides a technology of performing high-precision image-rendering of a worthful region in a content even when a user is viewing a virtual space from a free perspective, while reducing a processing load.

An electronic device according to the present invention includes: a processor; and a memory storing a program which, when executed by the processor, causes the electronic device to perform acquisition processing to acquire line-of-sight statistic information representing a degree at which a line of sight is directed to each of regions in a virtual space; and perform control processing to control a method of image-rendering processing for an image of the virtual space for each of the regions on the basis of the line-of-sight statistic information.

Further features of the present invention will become apparent from the following description of exemplary embodiments with reference to the attached drawings.

BRIEF DESCRIPTION OF THE DRAWINGS

FIGS. 7A and 7B are flow charts illustrating processing in the image processing system according to the third embodiment.

DESCRIPTION OF THE EMBODIMENTS

First Embodiment

Figure 1:
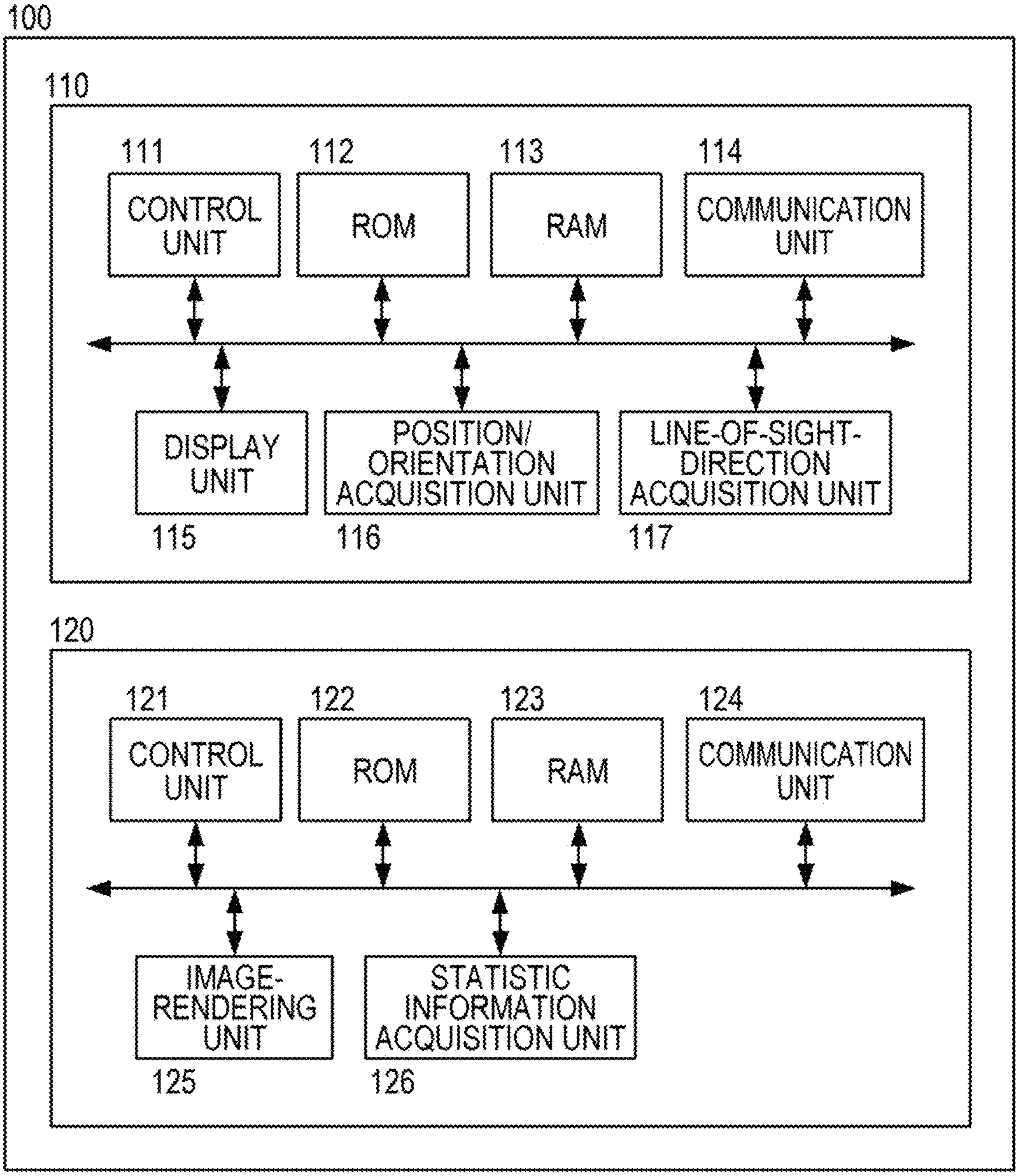
FIG. 1 is a diagram illustrating an example of a configuration of an image processing system according to a first embodiment.

Referring to the drawings, a detailed description will be given of embodiments of the present invention. Note that features, relative arrangements, and the like of components of each of devices are not intended to limit the scope of the present invention thereto unless otherwise particularly specified.

In the first embodiment, an image processing device image-renders a virtual image on the basis of a position and an orientation of a user wearing a display device such as an HMD and transmits the image-rendered image (image of a content) to a display device. The display device displays the image received from the image processing device on a display.

FIG. 1 is a diagram illustrating an example of a configuration of an image processing system 100 according to the first embodiment. The image processing system 100 includes a display device 110 and an image processing device 120. The image processing device 120 according to the first embodiment is an example of an electronic device according to the present invention. The display device 110 and the image processing device 120 are connected to be able to perform data communication therebetween. The connection between the display device 110 and the image processing device 120 may be either wired or wireless.

The display device 110 is a small-sized terminal such as an HMD, a hand-held display (HHD), or a smartphone. The user can view the image of the content, while wearing (holding) the display device 110 on a part of his or her body. The display device 110 includes a control unit 111, a ROM 112, a RAM 113, a communication unit 114, a display unit 115, a position/orientation acquisition unit 116, and a line-of-sight-direction acquisition unit 117.

For example, the control unit 111 is a CPU. The control unit 111 reads an operation program for each of blocks included in the display device 110 from the ROM 112, develops the operation program in the RAM 113, and executes the operation program to control an operation of each of the blocks included in the display device 110.

The ROM 112 is a read-only nonvolatile memory. The ROM 112 stores, in addition to the operation program for each of the blocks included in the display device 110, parameters, data, and the like to be used for the operation of each of the blocks. The RAM 113 is a rewritable volatile memory. The RAM 113 is used as, e.g., a temporary storage region for data output as a result of the operation of each of the blocks included in the display device 110.

For example, the communication unit 114 is a network card. The communication unit 114 is an interface for the display device 110 and the image processing device 120 to communicate with each other. The display unit 115 is a display device such as a liquid crystal display (LCD) or an organic electroluminescence (EL) display. The display unit 115 sequentially displays an image to the user.

For example, the position/orientation acquisition unit 116 is a gyro sensor or the like. The position/orientation acquisition unit 116 acquires positions and orientations of the user and the display device 110. The line-of-sight-direction acquisition unit 117 is a line-of-sight detection camera or the like. The line-of-sight-direction acquisition unit 117 acquires a direction in which the user is attentively looking.

For example, the image processing device 120 is a personal computer (PC) or the like. The image processing device 120 includes a control unit 121, a ROM 122, a RAM 123, a communication unit 124, an image-rendering unit 125, and a statistic information acquisition unit 126. The control unit 121, the ROM 122, the RAM 123, and the communication unit 124 are the same as the control unit 111, the ROM 112, the RAM 113, and the communication unit 114 of the display device 110, and therefore a description thereof is omitted.

The image-rendering unit 125 renders, from data stored in the ROM 122, an image to be displayed on the display unit 115. Rendering processing is processing of generating, from data of a content such as a virtual tour, an image to be displayed on the display unit 115 and viewed by the user.

The statistic information acquisition unit 126 uses information acquired from the position/orientation acquisition unit 116 and the line-of-sight-direction acquisition unit 117 to acquire line-of-sight statistic information. In other words, the statistic information acquisition unit 126 generates the line-of-sight statistic information on the basis of a virtual position of the user in a virtual space and a line-of-sight direction of the user who views an image. It is assumed that, in the present specification, the virtual space includes not only a space which is not present in a real space, but also a space representing a sightseeing spot or a museum present in the real space. The line-of-sight statistic information is information representing a degree at which a line of sight of the user is directed to each of regions in the virtual space. The image-rendering unit 125 can perform, on the basis of the line-of-sight statistic information, the rendering processing by controlling an image quality for each of the regions depending on the degree to which the line of sight of the user is directed to each of the regions.

The user mentioned herein may include a user currently viewing the content or may also include a user who previously viewed the content. The statistic information acquisition unit 126 stores the acquired line-of-sight statistic information in a storage device (storage medium or memory) not shown or the like. Examples of the storage medium include an external hard disk and a memory card.

Figure 2A:
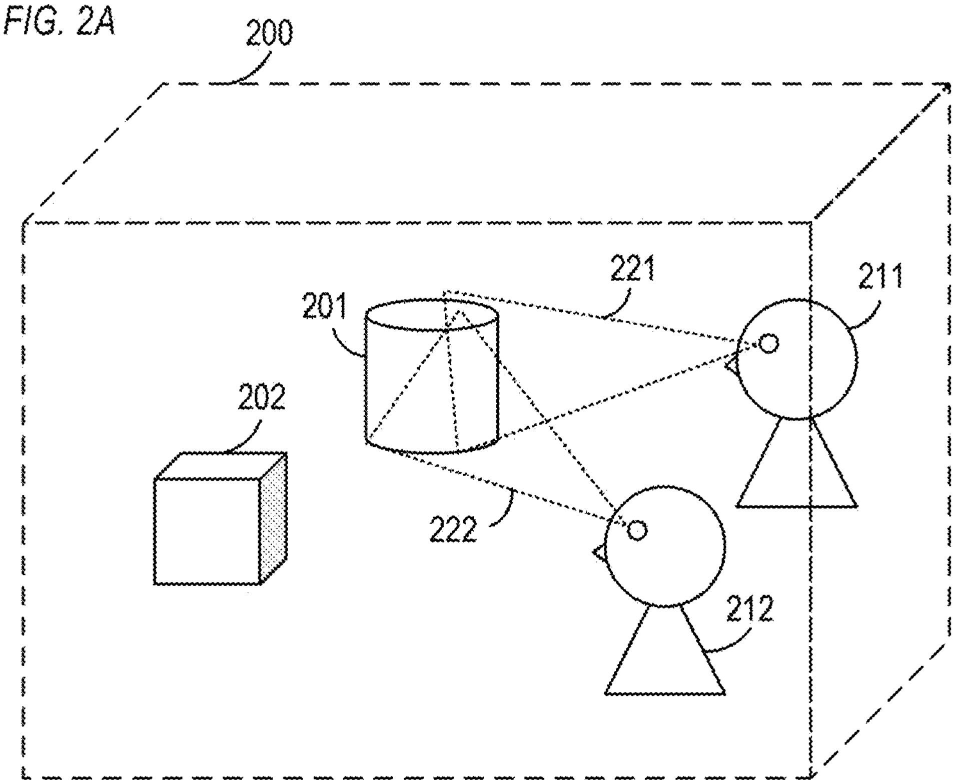
FIGS. 2A and 2B are diagrams illustrating line-of-sight statistic information.
Figure 2B:
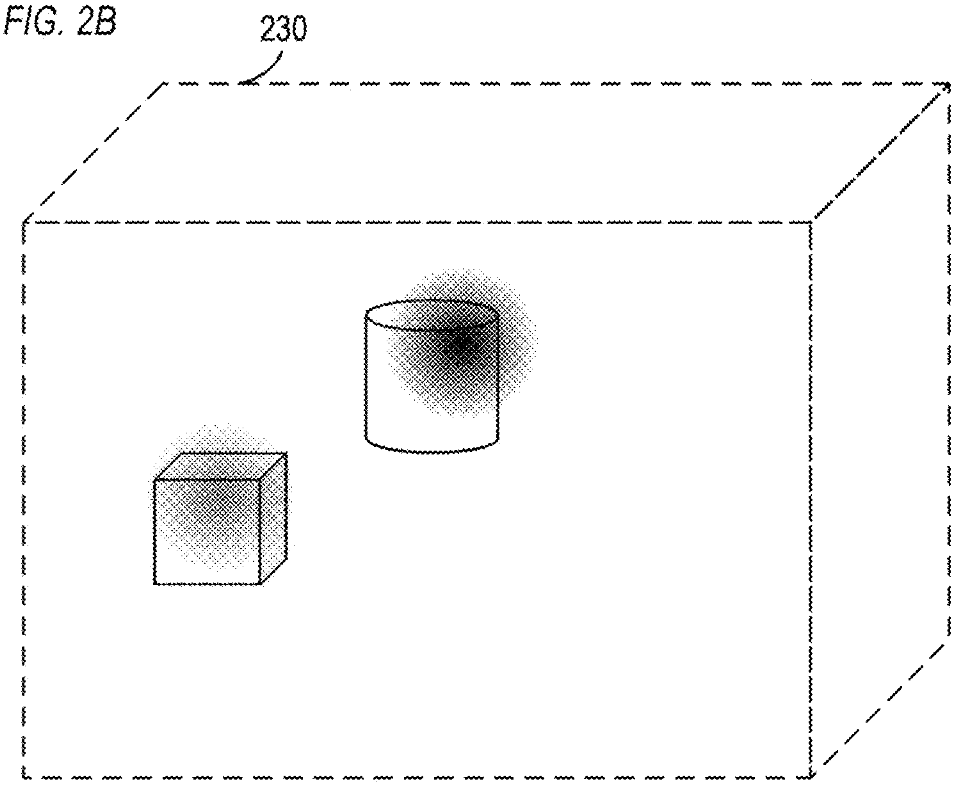

Referring to FIGS. 2A and 2B, a description will be given of the line-of-sight statistic information. FIG. 2A illustrates an example of a virtual space 200 in a content such as a virtual tour. The virtual space 200 is a space in which a virtual object 201 and a virtual object 202 are placed.

FIG. 2A illustrates a state where a first user 211 and a second user 212 who are experiencing the virtual space 200 are disposed at respective virtual positions in the virtual space 200. When an object popular in the virtual space 200 is the virtual object 201, it is assumed that a line of sight 221 of the first user 211 and a line of sight 222 of the second user 212 are directed to the virtual object 201. The statistic information acquisition unit 126 aggregates information on lines of sight directed to the virtual object 201 and the virtual object 202 to be able to acquire the line-of-sight statistic information such as a three-dimensional heat map 230 illustrated by way of example in FIG. 2B.

Alternatively, the line-of-sight statistic information may also be a line-of-sight frequency map indicating a frequency with which the line of sight of the user is directed to each of the regions in the virtual space. The line-of-sight frequency map is generated by, e.g., performing time integration on a point of intersection between the region and the line of sight of the user and mapping the frequency of the line of sight. Still alternatively, the line-of-sight statistic information may also be a line-of-sight density map indicating a weight according to the number of the users who have directed their lines of sight to each of the regions in the virtual space. The line-of-sight density map is generated by, e.g., weighting each of the regions in the virtual space with the number of the users who have directed their lines of slight to each of the regions and mapping densities of the lines of sight.

Yet alternatively, the line-of-sight statistic information may also be information on a frequency with which the line of sight is directed to an object placed in the virtual space. For example, when an ID is set to the rendered object, the statistic information acquisition unit 126 can acquire the line-of-sight statistic information by aggregating the frequency of the ID of the object to which the line of sight of the user is directed.

Still alternatively, the line-of-sight statistic information may also be information on a frequency with which the line of sight is directed to a segmented region obtained by applying semantic segmentation to an image of the virtual space displayed to the user. For example, the statistic information acquisition unit 126 can acquire the line-of-sight statistic information by aggregating a frequency of a semantic label corresponding to a semantic region to which the line of sight of the user is directed.

The line-of-sight statistic information may also be recorded in association with a time elapsed from the start of a content such as a virtual tour or an event such as a description of a specified object given by a tour guide. It is assumed that an object or a region to which the user directs his or her line of sight varies depending on the time elapsed from the start of the content or on timing of occurrence of the event. Accordingly, the statistic information acquisition unit 126 acquires the chronological line-of-sight statistic information according to the time or the event to allow the image-rendering unit 125 to appropriately determine the region on which the high-precision rendering is to be performed on the basis of the chronological line-of-sight statistic information.

The statistic information acquisition unit 126 acquires the chronological line-of-sight statistic information on the basis of the line-of-sight direction of the user who views the image of the virtual space, the virtual position of the user in the virtual space, and a time when the line-of-sight direction is detected. The chronological line-of-sight statistic information may also be acquired, e.g., at predetermined time intervals. By using the chronological line-of-sight statistic information acquired on the basis of the time, the image-rendering unit 125 can appropriately determine the region on which the high-precision rendering is to be performed depending on the elapsed time in the content.

Alternatively, the statistic information acquisition unit 126 acquires the line-of-sight statistic information for each of the events on the basis of the line-of-sight direction of the user who views the image of the virtual space, the virtual position of the user in the virtual space, and information on the event occurring when the line-of-sight direction is detected. By using the line-of-sight statistic information for each of the events acquired on the basis of the event, the image-rendering unit 125 can appropriately determine the region on which the high-definition rendering is to be performed depending on the event occurring during the viewing.

Note that the line-of-sight statistic information is not limited to the line-of-sight information of the user wearing the display device 110, and may also be generated by using line-of-sight information of another user who previously viewed the same content.

In addition, configurations of the display device 110 and the image processing device 120 each illustrated in FIG. 1 are exemplary, and are not limited thereto. For example, the display device 110 may also have the same configuration as that of the statistic information acquisition unit 126. In this case, the image processing device 120 receives the line-of-sight statistic information from the display device 110, and can render an image to be displayed on the display unit 115 by using the received line-of-sight statistic information.

Figures 3A, 3B:
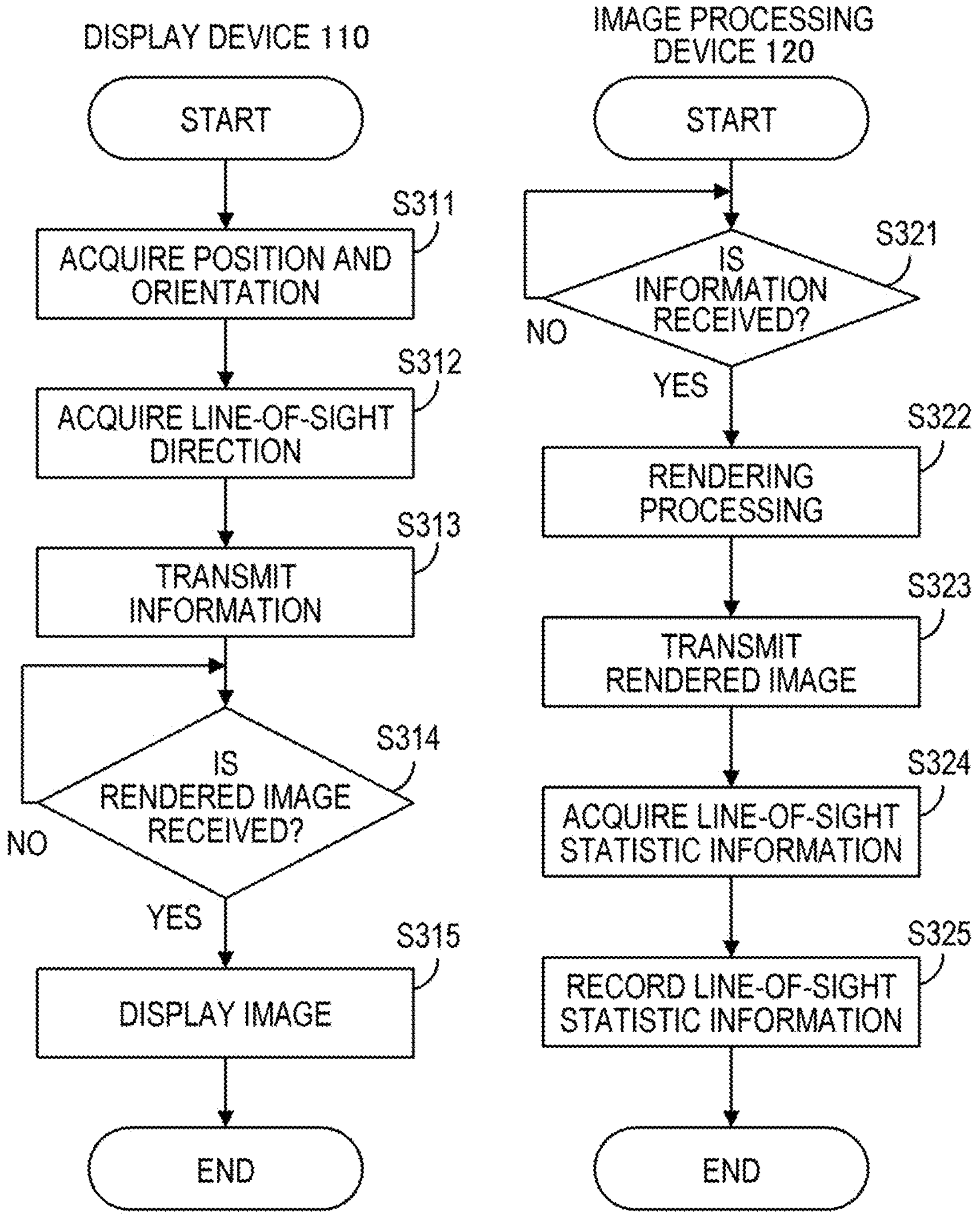
FIGS. 3A and 3B are flow charts illustrating processing in the image processing system according to the first embodiment.

Referring to FIGS. 3A and 3B, a description will be given of processing in the image processing system 100 that image-renders an image of a content which allows a virtual space to be experienced, such as a virtual tour. FIG. 3A is a flow chart illustrating an example of processing in the display device 110 worn by the user who views the content. FIG. 3B is a flow chart illustrating an example of processing in the image processing device 120 that transmits the image of the content resulting from the image-rendering to each of the display devices 110 worn by a plurality of the users who view the content.

Using FIG. 3A, a description will be given of the processing in the display device 110. In Step S311, the position/orientation acquisition unit 116 acquires information on the position and orientation of the user or the display device 110. The position/orientation acquisition unit 116 can acquire the information on the position and orientation of the display device 110 by using, e.g., a gyro sensor embedded in the display device 110.

Note that the position/orientation acquisition unit 116 may also acquire the information on the position and orientation of the user or the display device 110 determined by an external device. The information on the position and orientation of the user or the display device 110 can be determined by, e.g., analysis of an image captured by an external camera. Alternatively, the information on the position and orientation can also be determined by attaching a motion capture marker to the user or to the display device 110 and tracking a position of the marker.

In Step S312, the line-of-sight-direction acquisition unit 117 acquires information on the line-of-sight direction of the user. The line-of-sight-direction acquisition unit 117 can estimate the line-of-sight direction of the user by using a line-of-sight detection camera embedded in the display device 110. Note that the line-of-sight-direction acquisition unit 117 may also estimate a direction in which a face of the user is facing from the position and orientation acquired in Step S311 and acquire the estimated direction as the information on the line-of-sight direction.

In Step S313, the control unit 111 transmits the information on the position and orientation acquired in Step S311 and the information on the line-of-sight direction acquired in Step S312 to the image processing device 120 via the communication unit 114.

In Step S314, the control unit 111 determines whether or not the rendered image resulting from the rendering processing performed in Step S322 described later is received by the image processing device 120. When the rendered image is received, the processing advances to Step S315. When the rendered image is not received, the processing in S314 is repeated until the rendered image is received. In Step S315, the control unit 111 displays the rendered image received in Step S314 on the display unit 115.

Referring to FIG. 3B, a description will be given of the processing in the image processing device 120. In Step S321, the control unit 121 determines whether or not the information transmitted from the display device 110 in Step S313 is received via the communication unit 124. When the information is received from the display device 110, the processing advances to Step S322. When the information is not received from the display device 110, the processing in Step S321 is repeated until the information is received.

In Step S322, the image-rendering unit 125 performs the rendering processing (image-rendering processing) on an image to be displayed to the user wearing the display device 110. To reduce a load of the rendering processing, the image-rendering unit 125 controls, for each of the regions in the virtual space, a method for the rendering processing for the image of the virtual space on the basis of the line-of-sight statistic information acquired by the statistic information acquisition unit 126.

Specifically, the image-rendering unit 125 controls the image quality (level of detail) for each of the regions on the basis of the line-of-sight statistic information and performs the rendering processing. For example, the image-rendering unit 125 can perform control so as to perform higher-precision rendering on a region of interest to which the line of sight is directed more frequently than to another object. The region of interest is a region which is worth viewing by the user and to which the line of sight is directed more frequently than to another region, such as a region to which the user gives attention or a region popular to the user in the virtual space. The region of interest may also be a region of a specified object.

In the example in FIG. 2A, when it can be understood from the line-of-sight statistic information that the virtual object 201 is a popular object in the virtual space 200, the image-rendering unit 125 may also perform image-rendering such that an image quality of the virtual object 201 is higher than an image quality of the virtual object 202. Alternatively, when it can be understood from the line-of-sight statistic information that the virtual object 202 is an unpopular object, the image-rendering unit 125 may also perform image-rendering such that the image quality of the virtual object 202 is lower than the image quality of the virtual object 201.

Note that the image-rendering unit 125 can determine a type of each of regions for which the image quality is to be controlled and rendering is to be performed on the basis of a method of aggregating the line-of-sight statistic information. In the example in FIG. 2A, the line-of-sight information is aggregated for each of virtual objects (objects), and accordingly the image-rendering unit 125 controls the image quality for each of the objects and performs the rendering processing. Alternatively, when the line-of-sight statistic information is, e.g., information aggregated for each of a predetermined number of regions into which the virtual space is divided and which have the same size, the image-rendering unit 125 can control the image quality for each of the predetermined number of regions having the same size and perform the rendering processing.

To prevent the rendering processing from being delayed even when there is an abrupt visual field change, the image-rendering unit 125 can also perform preliminary rendering (image-rendering) on an object or a region outside the range of a visual field (outside a display range) of the user who views the image of the virtual space in the display device 110. The preliminary rendering of the object or region outside the display range is hereinafter referred to as the preliminary rendering. By controlling whether or not to perform the preliminary rendering on the basis of the line-of-sight statistic information, the image-rendering unit 125 can respond to the visual field change at an appropriate time and also inhibit the processing load from being increased.

In the example in FIG. 2A, when it can be understood from the line-of-field statistic information that the virtual object 201 is a popular object in the virtual space 200, the image-rendering unit 125 may also be prepared for an abrupt visual field change by performing the preliminary rendering even when the virtual object 201 is outside the display range. Meanwhile, when it can be understood from the line-of-sight statistic information that the virtual object 202 is an unpopular object, it may also be possible for the image-rendering unit 125 not to perform the preliminary rendering on the virtual object 202 so as to reduce the processing load.

Note that the line-of-sight statistic information is not limited to the line-of-sight information of the user who is currently viewing (experiencing) the content, and may also be generated on the basis of line-of-sight information of the user who previously viewed the same content. Alternatively, the line-of-sight statistic information may also be generated on the basis of the previous line-of-sight information of the same user, not by using previous line-of-sight information of all the users.

It may also be possible for the statistic information acquisition unit 126 to preliminarily estimate the user having an attribute corresponding (similar) to that of the user who is currently viewing the content and generate the line-of-sight statistic information on the basis of previous line-of-sight information of the user having the corresponding attribute. Examples of the attribute of the user include a gender, an age, a hobby, and the like of the user, which are stored together with the line-of-sight statistic information when the user views the content. When, e.g., attributes which are among a plurality of attributes and the number of which is larger than a predetermined number match, the statistic information acquisition unit 126 can determine that the respective attributes of the individual users correspond to each other.

In Step S323, the control unit 121 transmits the rendered image resulting from the image-rendering in Step S322 to the display device 110 via the communication unit 124.

In Step S324, the statistic information acquisition unit 126 uses the information on the position and orientation and the information on the line-of-sight direction, which is received from the display device 110 in Step S313, to acquire the line-of-sight statistic information. In Step S325, the statistic information acquisition unit 126 records the line-of-sight statistic information acquired in Step S324 in the storage device or the like. The processing in Step S324 and Step S325 allows the statistic information acquisition unit 126 to generate the line-of-sight statistic information or update the existing line-of-sight statistic information on the basis of the line-of-sight information of the user who is currently viewing the content.

Note that the line-of-sight statistic information acquisition processing in Step S324 and the line-of-sight statistic information recording processing in Step S325 may also be performed offline after the user ended viewing the content. By performing the line-of-sight statistic information acquisition processing and the line-of-sight statistic information recording processing offline, the image processing device 120 can reduce the processing load. The reduced processing load allows the user to have a comfortable virtual experience. When the line-of-sight statistic information acquisition processing and the line-of-sight statistic information recording processing are performed offline, in Step S322, the image-rendering unit 125 performs the rendering processing using the line-of-sight statistic information based on previous line-of-sight information.

In the first embodiment described above, the image processing device 120 acquires the line-of-sight statistic information aggregated for each of the regions in the virtual space. By controlling the method of the rendering processing for the image of the virtual space on the basis of the line-of-sight statistic information, the image processing device 120 can perform control such that the region of interest is rendered with high precision. In addition, by lowering the image quality in a region other than the region of interest, the image processing device 120 can reduce the processing load, while performing high-precision image-rendering on the worthful region (region of interest).

Moreover, by controlling whether or not to perform the preliminary rendering on the basis of the line-of-sight statistic information, the image processing device 120 can flexibly respond to a visual field change of the user and improve a processing speed.

Second Embodiment

In the first embodiment, the image processing device 120 transmits the rendered image to the display device 110 worn by each of the users, and the display device 110 displays the received image. By contrast, in the second embodiment, an image processing device 420 transmits data on a three-dimensional model or the like for generating an image of a virtual space to a display device 410, which is a user terminal, and the display device 410 renders the received data and displays the rendered data. In other words, in the first embodiment, the rendering processing is performed in the image processing device 120 while, in the second embodiment, the rendering processing is performed in the display device 410. The display device 410 according to the second embodiment is an example of the electronic device.

A detailed description of the same processing as that in the first embodiment is omitted. In addition, the same components as those in the first embodiment are denoted by the same reference numerals, and a detailed description thereof is omitted. A description will be given below of main features of the second embodiment.

Figure 4:
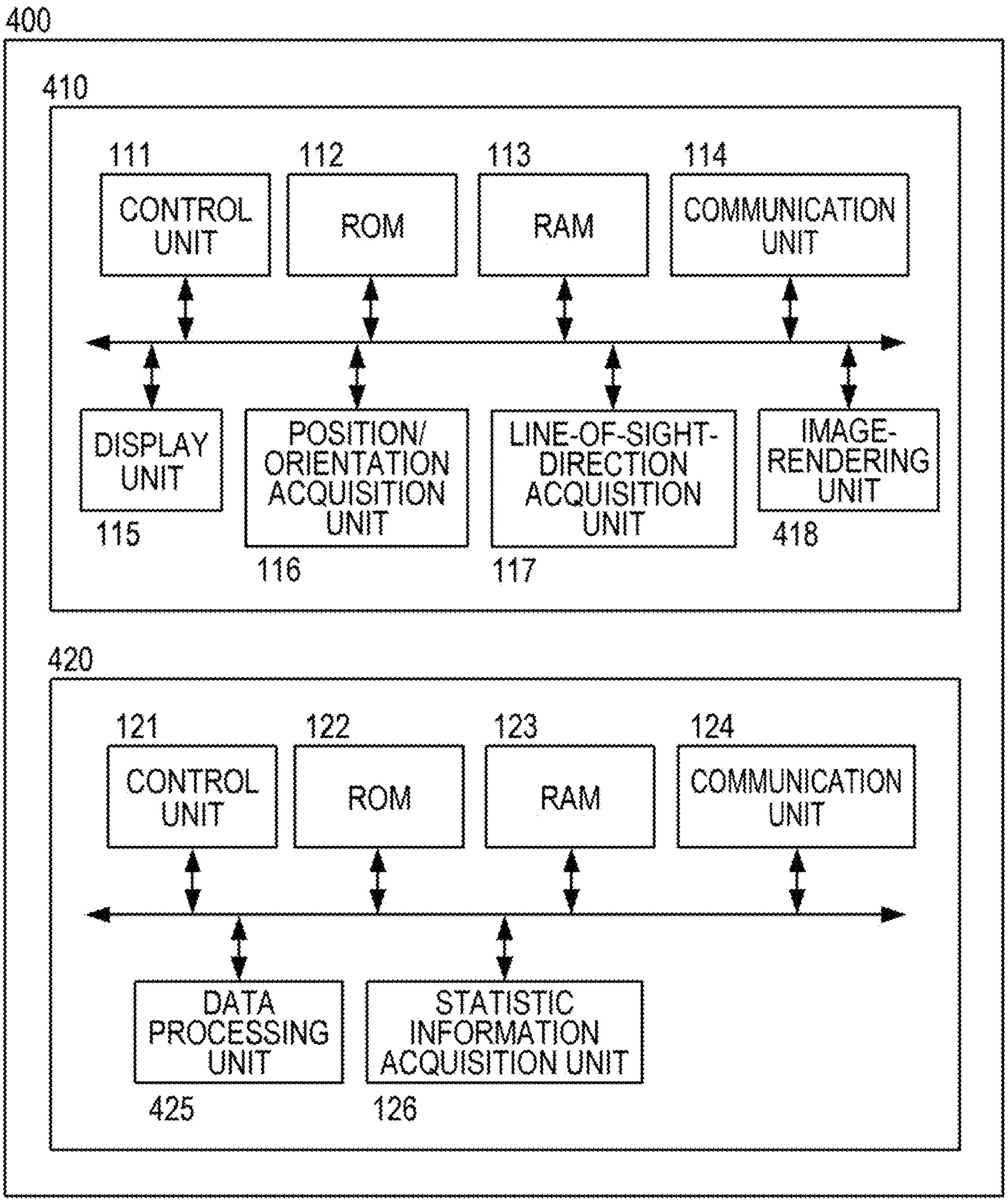
FIG. 4 is a diagram illustrating an example of a configuration of an image processing system according to a second embodiment.

FIG. 4 is a diagram illustrating an example of a configuration of an image processing system 400 according to the second embodiment. The image processing system 400 includes the display device 410 and the image processing device 420. The display device 410 and the image processing device 420 are connected to be able to perform data communication therebetween. The connection between the display device 410 and the image processing device 420 may be either wired or wireless.

The display device 410 is a small-sized terminal such as an HMD, an HHD, or a smartphone. The display device 410 includes the control unit 111, the ROM 112, the RAM 113, the communication unit 114, the display unit 115, the position/orientation acquisition unit 116, the line-of-sight-direction acquisition unit 117, and an image-rendering unit 418. Of the components of the display device 410, the components other than the image-rendering unit 418 are the same as those in the first embodiment. By performing rendering processing on data received from the image processing device 420, the image-rendering unit 418 generates an image to be displayed on the display unit 115. Line-of-sight statistic information to be used by the image-rendering unit 418 for the rendering processing may be received together with data of a content from the image processing device 420 or may also be stored in advance in a storage device of the display device 410.

For example, the image processing device 420 is a PC or the like. The image processing device 420 includes the control unit 121, the ROM 122, the RAM 123, the communication unit 124, a data processing unit 425, and the statistic information acquisition unit 126. Of the components of the image processing device 420, the components other than the data processing unit 425 are the same as those in the first embodiment. The data processing unit 425 processes data to be transmitted to the display device 410 on the basis of the line-of-sight statistic information.

Figure 5A:
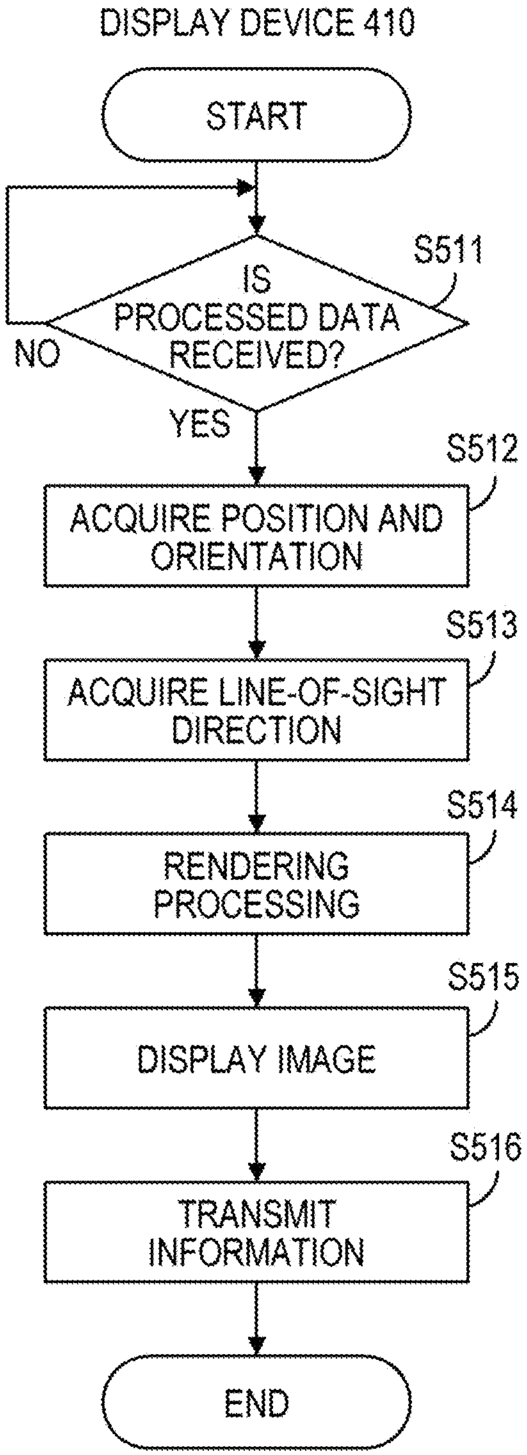
FIGS. 5A and 5B are flow charts illustrating processing in the image processing system according to the second embodiment.
Figure 5B:
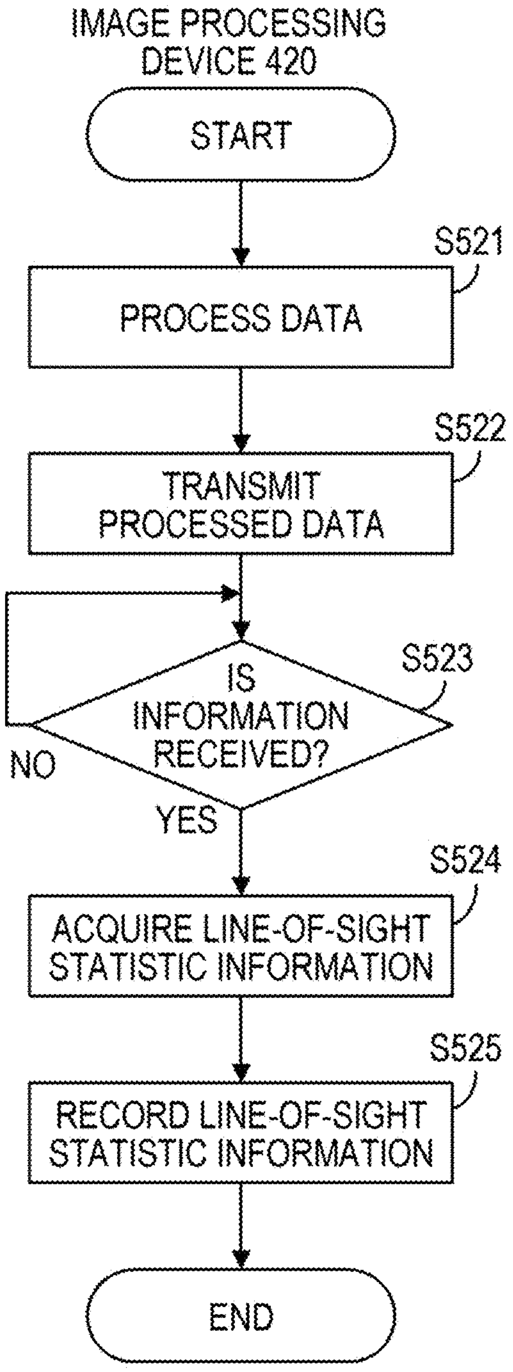

Referring to FIGS. 5A and 5B, a description will be given of processing in the image processing system 400 that image-renders an image of a content which allows a virtual space to be experienced, such as a virtual tour. The image processing device 420 transmits the data on the three-dimensional model or the like for generating the image of the virtual space to the display device 410. The display device 410 performs rendering processing on the received data in the inside thereof.

FIG. 5A is a flow chart illustrating an example of processing in the display device 410 worn by a user who views the content. FIG. 5B is a flow chart illustrating an example of processing in the image processing device 420 that transmits the data for generating the image of the virtual space to each of the display devices 410 worn by a plurality of the individual users who view the content.

Referring to FIG. 5A, a description will be given of the processing in the display device 410. In Step S511, the control unit 111 determines whether or not the processed data processed in Step S521 described later is received by the image processing device 420. When the processed data is received, the processing advances to Step S512. When the processed data is not received, the processing in Step S511 is repeated until the processed data is received.

Processing in Step S512 and Step S513 is the same as the processing in Step S311 and Step S312 in the display device 110 described with reference to FIG. 3A. In Step S512 and Step S513, the display device 410 acquires information on the position and orientation of the user or the display device 110 and information of the line-of-sight direction of the user.

Processing in S514 is the same as the processing in Step S322 by the image processing device 120 described with reference to FIG. 3B. In other words, the rendering processing (image-rendering processing) performed by the image processing device 120 in the first embodiment is performed by the display device 410 in the second embodiment. Similarly to Step S322 in FIG. 3B, the image-rendering unit 418 of the display device 410 performs the rendering processing on an image to be displayed to the user wearing the display device 410. By controlling, for each of regions in the virtual space, a method of the rendering processing for the image of the virtual space on the basis of the line-of-sight statistic information, the image-rendering unit 418 can perform high-precision image-rendering on a worthful region in the content and also reduce a processing load. The image-rendering unit 418 may use the line-of-sight statistic information stored in advance in the storage device included in the display device 410, and may also use the line-of-sight statistic information received from the image processing device 420.

The processing in Step S515 is the same as the processing in Step S315 in the display device 110 described with reference to FIG. 3A. The control unit 111 displays the rendered image resulting from the rendering processing in Step S514 to the display unit 115.

Processing in Step S516 is the same as the processing in Step S313 in the display device 110 described with reference to FIG. 3A. The control unit 111 transmits the information on the position and orientation acquired in Step S512 and the information on the line-of-sight direction acquired in Step S513 to the image processing device 420 via the communication unit 114.

Referring to FIG. 5B, a description will be given of the processing in the image processing device 420. In Step S521, the data processing unit 425 performs processing of reducing an amount of the data on the three-dimensional model or the like in the virtual space on the basis of line-of-sight statistic information previously generated by using line-or-sight information of the user who viewed the same content. The processed data is transmitted to the display device 410 and accordingly, by reducing an amount of data of the processed data to be transmitted, the user can more comfortably experience the content of the virtual space.

For example, the data processing unit 425 may also reduce the amount of the data by processing the number of polygons in three-dimensional model data on the basis of the line-of-sight statistic information. By reducing the number of polygons in an object to which the lines of sight are scarcely directed, while maintaining the number of polygons in a popular object, the data processing unit 425 can reduce an amount of communication data.

In the example in FIG. 2A, when it can be understood from the line-of-sight statistic information that the virtual object 201 is a popular object in the virtual space 200, the image-rendering unit 125 may also set the number of polygons in the virtual object 201 larger than that in another object. Meanwhile, when it can be understood from the line-of-sight statistic information that the virtual object 202 is an unpopular object, the image-rendering unit 125 may also reduce the number of polygons in the virtual object 202.

Alternatively, the data processing unit 425 may also change, e.g., a type of the model of the three-dimensional model data on the basis of the line-of-sight statistic information. The data processing unit 425 may also change the object to which the lines of sight are scarcely directed to a model in which a texture is merely applied to a plane or to a simple model in which a texture is represented by a known method such as bump mapping.

In the example in FIG. 2A, when it can be understood from the line-of-sight statistic information that the virtual object 202 is an unpopular object in the virtual space 200, the virtual object 202 may also be changed to the simple model. By changing the unpopular object to the simple model in the data to be transmitted to the display device 410, the data processing unit 425 can not only reduce the amount of communication data, but also reduce a load of the rendering processing in the display device 410. By changing the type of the model of the three-dimensional model data, the data processing unit 425 can appropriately control the load of the rendering processing in the display device 410.

In Step S522, the control unit 121 transmits the processed data processed in Step S521 to the display device 410 via the communication unit 124. When, e.g., transmitting the processed data to the display device 410 of the user who views the content, the control unit 121 may also control an order in which the processed data is transmitted to the display device 410 for each of the regions on the basis of the line-of-sight statistic information.

In the example in FIG. 2A, when it can be understood from the line-of-sight statistic information that the virtual object 201 is a popular object in the virtual space 200, the control unit 121 may also preferentially transmit data on the virtual object 201 to the display device 410. Even when communication is delayed, by preferentially transmitting the popular object to the display device 410, the control unit 121 can reduce a stress felt by the user who is experiencing the virtual space.

Processing in Step S523 is the same as the processing in Step S321 in the image processing device 120 described with reference to FIG. 3B. In Step S523, the control unit 121 determines whether or not the information transmitted from the display device 410 in Step S516 is received via the communication unit 124. When the information is received from the display device 410, the processing advances to Step S524. When the information is not received from the display device 410, the processing in Step S523 is repeated until the information is received.

Processing in Step S524 and Step S525 is the same as the processing in Step S324 and Step S325 in the image processing device 120 described with reference to FIG. 3B. In Step S524 and Step S525, the statistic information acquisition unit 126 acquires the line-of-sight statistic information and records the acquired line-of-sight statistic information in a storage device or the like.

In the second embodiment described above, the image processing device 420 acquires the line-of-sight statistic information aggregated for each of the regions in the virtual space. The image processing device 420 transmits the data on the three-dimensional model or the like for generating the image of the virtual space to the display device 410 worn by the user. The display device 410 controls, on the basis of the line-of-sight statistic information, a method of the rendering processing for the data received from the image processing device 420 for each of the regions. In other words, the display device 410 performs high-precision rendering on the region of interest, while performing rendering with a lower image quality on the region other than the region of interest. As a result, even when the rendering processing is performed inside the display device 410, the display device 410 can reduce the processing load and improve the processing speed, while performing high-precision image-rendering on the worthful region (region of interest).

Alternatively, the image processing device 420 may also process the data on the three-dimensional model or the like for generating the image of the virtual space on the basis of the line-of-sight statistic information. In the region other than the region of interest, by performing processing such as reduction of the number of polygons in the object or changing of the three-dimensional model to the simple model, the image processing device 420 can reduce an amount of the data to be transmitted to the display device 410.

Still alternatively, the image processing device 420 may also control an order of data items to be transmitted to the display device 410 on the basis of the line-of-sight statistic information. By preferentially transmitting data on the region of interest to the display device 410, the image processing device 420 allows the user to view the worthful region (region of interest) without delay.

Third Embodiment

The third embodiment is an embodiment that transmits an image photographed by an image processing device 620, which is a 360-degree camera (omnidirectional camera), to the display device 410 serving as the user terminal and displays the image according to a direction in which a user faces inside the display device 410.

A detailed description of the same processing as in the first embodiment or the second embodiment is omitted. In addition, the same components as those in the first embodiment or the second embodiment are denoted by the same reference numerals, and a detailed description thereof is omitted. A description will be given below of main features of the third embodiment.

Figure 6:
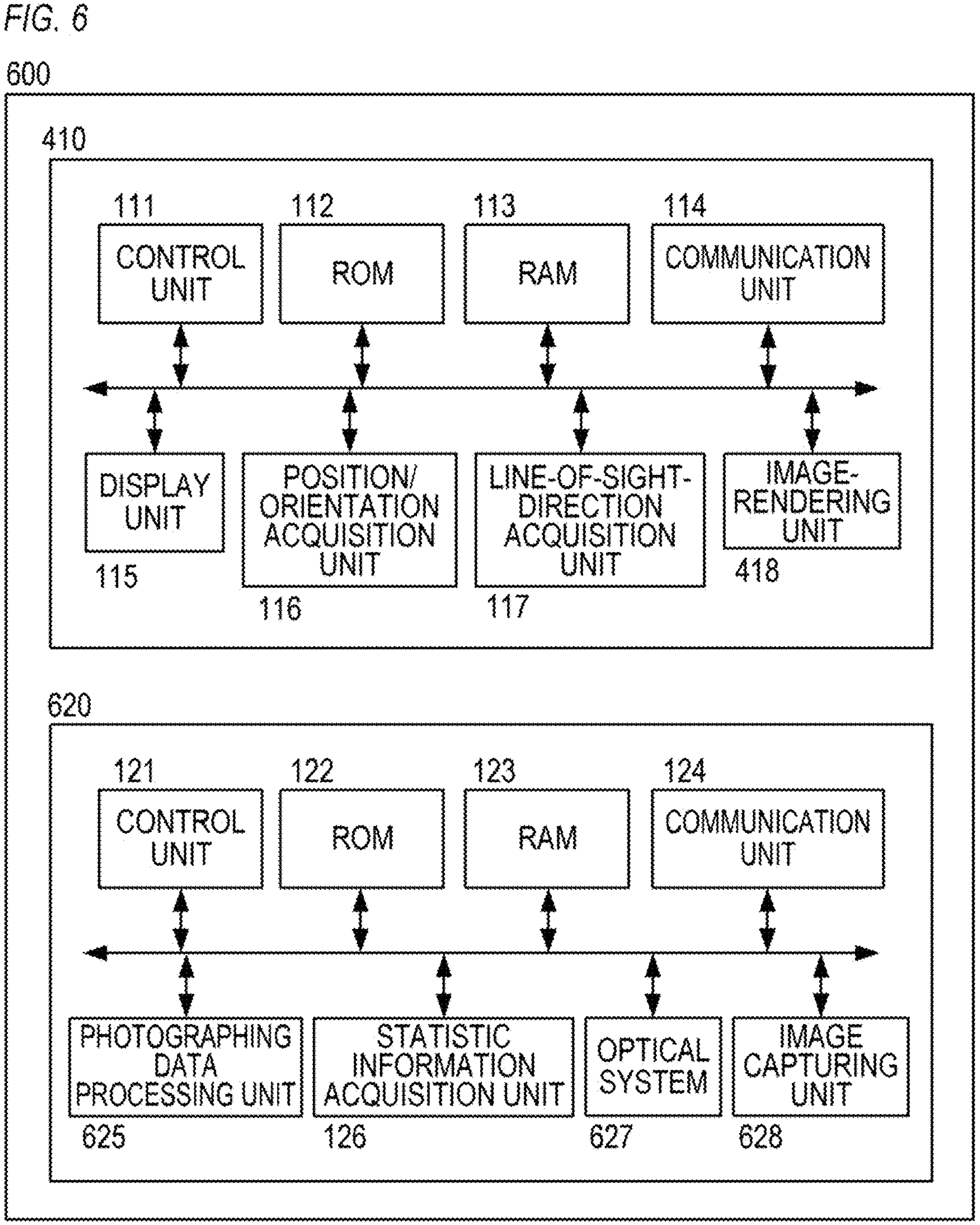
FIG. 6 is a diagram illustrating an example of a configuration of an image processing system according to a third embodiment.

FIG. 6 is a diagram illustrating an example of a configuration of an image processing system 600 according to the third embodiment. The image processing system 600 includes the display device 410 and the image processing device 620. The display device 410 and the image processing device 620 are connected to be able to perform data communication therebetween. The connection between the display device 410 and the image processing device 620 may be either wired or wireless. The display device 410 is the same as that in the second embodiment, and therefore a description thereof is omitted.

The image processing device 620 is the 360-degree camera or the like, and includes a control unit 121, a ROM 122, a RAM 123, a communication unit 124, a photographing data processing unit 625, a statistic information acquisition unit 126, an optical system 627, and an image capturing unit 628. Of the components of the image processing device 620, the components other than the photographing data processing unit 625, the optical system 627, and the image capturing unit 628 are the same as those in the first embodiment.

The photographing data processing unit 625 processes the image captured by the image capturing unit 628. The optical system 627 is, e.g., a fish-eye lens and forms images of surroundings on the image capturing unit 628. The image capturing unit 628 is an image capturing element such as, e.g., a CCD or a CMOS sensor which photoelectrically converts an optical image formed on the image capturing element by the optical system 627 and outputs the obtained signal to the RAM 123 such that the signal is stored therein.

Referring to FIGS. 7A and 7B, a description will be given of processing in the image processing system 600 which transmits the image photographed by the image processing device 620 to the display device 410 and displays the image according to the direction in which the user faces inside the display device 410.

FIG. 7A is a flow chart illustrating an example of the processing in the display device 410 worn by the user who views a content. FIG. 7B is a flow chart illustrating an example of processing in the image processing device 620 which processes data obtained by the photographing using the 360-degree camera and transmits the processed data to the respective display devices 410 worn by a plurality of the users who view the content.

Referring to FIG. 7A, a description will be given of the processing in the display device 410. In Step S711, the control unit 111 determines whether or not the processed data processed in Step S722 described later is received by the image processing device 620. When the processed data is received, the processing advances to Step S712. When the processed data is not received, the processing in S711 is repeated until the processed data is received. The processing in Steps S712 to S716 is the same as the processing in Steps S512 to S516 in the display device 410 described with reference to FIG. 5A.

Referring to FIG. 7B, a description will be given of processing in the image processing device 620. In Step S721, the optical system 627 and the image capturing unit 628 combine a plurality of lenses and a plurality of image capturing sensors to perform 360-degree omnidirectional photographing.

In Step S722, the photographing data processing unit 625 processes the photographing data obtained by the photographing in Step S721. For example, the photographing data processing unit 625 combines a plurality of photographed images which are photographed in different directions by a combination of the plurality of lenses and the plurality of image capturing sensors to generate a 360-degree image. To eliminate a feeling of strangeness of joints resulting from the combining processing, the photographing data processing unit 625 performs image processing such as alignment or brightness correction.

For example, the photographing data processing unit 625 may also control a load of image processing for combining the plurality of photographed images on the basis of the line-of-sight statistic information for each of the regions. Specifically, the photographing data processing unit 625 may also control a priority and processing performance of the image processing for each of the regions. By performing high-load image processing on a region on which the lines of sight of the users are focused and omitting at least a part of the image processing in another region, the photographing data processing unit 625 can reduce the processing load.

In the example in FIG. 2A, when it can be understood from the line-of-sight statistic information that a region where the virtual object 201 is present is popular in the virtual space 200, the photographing data processing unit 625 may also perform the high-load image processing on the region where the virtual object 201 is present. Meanwhile, when it can be understood from the line-of-sight statistic information that a region where the virtual object 202 is present is unpopular, it may be possible for the photographing data processing unit 625 not to perform the image processing on the region where the virtual object 202 is present or to omit a part of the processing.

Alternatively, the photographing data processing unit 625 may also control, e.g., a compression ratio at which the 360-degree image is to be compressed on the basis of the line-of-sight statistic information for each of the regions. In the example in FIG. 2A, when it can be understood from the line-of-sight statistic information that the region where the virtual object 202 is present is unpopular in the virtual space 200, the compression ratio for the photographing data in the region where the virtual object 202 is present may also be set higher than the compression ratio in another region. By setting higher the compression ratio in the region to which the user scarcely directs his or her line of sight, the photographing data processing unit 625 can reduce the amount of data to be transmitted from the image processing device 620 to the display device 410, while maintaining the image quality in the region of interest.

In Step S723, the control unit 121 transmits the processed data processed in Step S722 to the display device 410 via the communication unit 124.

Processing in Step S724 is the same as the processing in Step S523 in the image processing device 420 described with reference to FIG. 5B. In Step S724, the control unit 121 determines whether or not the information transmitted from the display device 410 to the image processing device 620 in Step S716 is received via the communication unit 124. When the information is received from the display device 410, the processing advances to Step S725. When the information is not received from the display device 410, the processing in Step S724 is repeated until the information is received.

Processing in Step S725 and S726 is the same as the processing in Step S524 and Step S525 in the image processing device 420 described with reference to FIG. 5B. In Step S725 and Step S726, the statistic information acquisition unit 126 acquires the line-of-sight statistic information and records the acquired line-of-sight statistic information in the storage device or the like.

In the third embodiment described above, the image processing device 620 acquires the line-of-sight statistic information aggregated for each of the regions in the virtual space. The image processing device 620 processes the photographing data obtained by the photographing using the 360-degree camera and transmits the processed photographing data to the display device 410 worn by the user. The display device 410 controls, on the basis of the line-of-sight statistic information, the method of the rendering processing for the data received from the image processing device 420 for each of the regions. Consequently, even when the rendering processing is performed inside the display device 410, the display device 410 can reduce the processing load and improve the processing speed, while performing high-precision image-rendering on the worthful region (region of interest).

Alternatively, the image processing device 620 may also process the photographing data on the basis of the line-of-sight statistic information. By performing the high-load image processing on the region of interest and omitting a part of the image processing on the region other than the region of interest, the image processing device 620 can reduce the processing load. In addition, by setting the compression ratio for the photographing data in the region of interest higher than the compression ratio in another region, the image processing device 620 can reduce the amount of data to be transmitted, while maintaining the image quality in the region of interest.

While the description has been given heretofore of the preferred embodiments of the present invention, the present invention is not limited to these embodiments, and the configurations in the embodiments described above can variously be modified and changed within the scope of the gist thereof. It is also possible to combine the configurations in the embodiments described above as appropriate.

According to the present invention, even when the user is viewing the virtual space from a free perspective, it is possible to perform high-precision image-rendering on a worthful region in a content and also reduce a processing load.

The various controls described above may or may not be performed by a single hardware (e.g., a processor or circuit). A plurality of hardware (e.g., a plurality of processors, a plurality of circuits, or a combination of one or more processors and one or more circuits) may share the processing to control the entire device.

The above processors are processors in the broadest sense and include both general purpose and specialized processors. The general-purpose processors include, for example, CPU (Central Processing Unit), MPU (Micro Processing Unit), and DSP (Digital Signal Processor). The specialized processors include, for example, GPU (Graphics Processing Unit), ASIC (Application Specific Integrated Circuit), PLD (Programmable Logic Device), etc. The programmable logic devices are, for example, FPGA (Field Programmable Gate Array), CPLD (Complex Programmable Logic Device), etc.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2023-111472, filed on Jul. 6, 2023, which is hereby incorporated by reference herein in its entirety.

What is claimed is:

1. An electronic device comprising:

a processor; and a memory storing a program which, when executed by the processor, causes the electronic device to perform acquisition processing to acquire line-of-sight statistic information representing a degree at which a line of sight is directed to each of regions in a virtual space; and perform control processing to control a method of image-rendering processing for an image of the virtual space for each of the regions on the basis of the line-of-sight statistic information, wherein, in the control processing, whether or not to preliminarily image-render a region outside a range of a visual field of a user who views the image is controlled on the basis of the line-of-sight statistic information.

2. The electronic device according to claim 1, wherein, in the acquisition processing, the line-of-sight statistic information is generated on the basis of a line-of-sight direction of a user who views the image and a virtual position of the user in the virtual space.

3. The electronic device according to claim 1, wherein, in the control processing, an image quality of the image is controlled for each of the regions on the basis of the line-of-sight statistic information.

4. The electronic device according to claim 3, wherein, before the image-rendering processing is performed, processing of reducing an amount of data on the image can be performed and wherein, in the control processing, the processing of reducing an amount of data is controlled for each of the regions on the basis of the line-of-sight statistic information.

5. The electronic device according to claim 3, wherein, in the control processing, a compression ratio at which the image is to be compressed is controlled for each of the regions on the basis of the line-of-sight statistic information in a case where the image is an image photographed by using a camera.

6. The electronic device according to claim 1, wherein, in the control processing, an order in which the data on the image is to be transmitted to the display device is controlled for each of the regions on the basis of the line-of-sight statistic information when data on the image is transmitted to a display device.

7. The electronic device according to claim 1, wherein, in the control processing, a load of image processing for combining a plurality of photographed images with each other is controlled for each of the regions on the basis of the line-of-sight statistic information in a case where the image is generated by combining the plurality of photographed images which are photographed in different directions with each other.

8. The electronic device according to claim 1, wherein the line-of-sight statistic information is a line-of-sight frequency map indicating a frequency with which the line of sight is directed to each of the regions.

9. The electronic device according to claim 1, wherein the line-of-sight statistic information is a line-of-sight density map indicating a weight according to the number of users who have directed the lines of sight to each of the regions.

10. The electronic device according to claim 1, wherein the line-of-sight statistic information is information on a frequency with which the line of sight is directed to an object placed in the virtual space.

11. The electronic device according to claim 1, wherein the line-of-sight statistic information is information on a frequency with which the line of sight is directed to a segmented region obtained by applying semantic segmentation to the image.

12. The electronic device according to claim 1, wherein, in the acquisition processing, a chronological line-of-sight statistic information is acquired on the basis of a line-of-sight direction of a user who views the image, a virtual position of the user in the virtual space, and a time when the line-of-sight direction is detected, and wherein, in the control processing, image-rendering processing for the image is controlled for each of the regions on the basis of the chronological line-of-sight statistic information.

13. The electronic device according to claim 1, wherein the line-of-sight statistic information is generated on the basis of previous line-of-sight information of another user having an attribute corresponding to an attribute of a user who views the image.

14. The electronic device according to claim 1, further comprising:

a communication interface that communicates with a display device including a detector that detects a line-of-sight direction of a user who views the image and a display that displays an image of the virtual space, wherein a method of image-rendering an image displayed on the display via the communication interface is controlled for each of the regions.

15. The electronic device according to claim 1, further comprising:

a display that displays an image of the virtual space, wherein, in the control processing, the display is controlled to control the method of the image-rendering processing for each of the regions.

16. A control method for an electronic device, the control method comprising:

acquiring line-of-sight statistic information representing a degree at which a line of sight is directed to each of regions in a virtual space; and controlling a method of image-rendering processing for an image of the virtual space for each of the regions on the basis of the line-of-sight statistic information, wherein, in the controlling, whether or not to preliminarily image-render a region outside a range of a visual field of a user who views the image is controlled on the basis of the line-of-sight statistic information.

17. A non-transitory computer readable medium that stores a program, wherein the program causes a computer to execute a control method of an electronic device, the control method comprising:

acquiring line-of-sight statistic information representing a degree at which a line of sight is directed to each of regions in a virtual space; and controlling a method of image-rendering processing for an image of the virtual space for each of the regions on the basis of the line-of-sight statistic information, wherein, in the controlling, whether or not to preliminarily image-render a region outside a range of a visual field of a user who views the image is controlled on the basis of the line-of-sight statistic information.

* * * * *